United States Patent
Chen et al.

(10) Patent No.: US 7,857,377 B2
(45) Date of Patent: Dec. 28, 2010

(54) TUBULAR B-PILLAR TO STAMPED ROCKER JOINT AND METHOD OF ASSEMBLING THE SAME

(75) Inventors: Xiaoming Chen, Canton, MI (US); Omar Faruque, Ann Arbor, MI (US); Thierry Guimberteau, Livonia, MI (US); Everett Kuo, Troy, MI (US); Raj Mehta, Westland, MI (US); Louis Ratsos, Commerce Township, MI (US); Parameswararao Pothuraju, Canton, MI (US); Dean Gericke, Brighton, MI (US); Daniel Szalay, Belleville, MI (US)

(73) Assignees: Ford Global Technologies, LLC, Dearborn, MI (US); Vari-Form, Inc., Warren, MI (US)

( * ) Notice: Subject to any disclaimer, the term of this patent is extended or adjusted under 35 U.S.C. 154(b) by 610 days.

(21) Appl. No.: 11/539,766

(22) Filed: Oct. 9, 2006

(65) Prior Publication Data

US 2008/0093892 A1    Apr. 24, 2008

(51) Int. Cl.
B62D 27/02    (2006.01)
(52) U.S. Cl. ............................... 296/203.03
(58) Field of Classification Search ............ 296/203.03, 296/209, 193.05, 193.06, 187.12
See application file for complete search history.

(56) References Cited

U.S. PATENT DOCUMENTS

| | | | |
|---|---|---|---|
| 3,132,891 A * | 5/1964 | Pyuro et al. | 296/204 |
| 4,252,364 A * | 2/1981 | Toyama et al. | 296/203.01 |
| 4,550,948 A | 11/1985 | Hamada et al. | |
| 4,552,400 A * | 11/1985 | Harasaki et al. | 296/203.03 |
| 4,634,173 A | 1/1987 | Aonuma et al. | |
| 4,911,495 A * | 3/1990 | Haga et al. | 296/209 |

(Continued)

FOREIGN PATENT DOCUMENTS

CN    1807169 A    7/2006

(Continued)

OTHER PUBLICATIONS

International Search Report for PCT/US07/80775 dated Sep. 29, 2008.

(Continued)

Primary Examiner—H Gutman
(74) Attorney, Agent, or Firm—Frederick Owens; Brooks Kushman P.C.

(57) ABSTRACT

A pillar to rocker joint assembly comprising a tubular pillar having a pinched flange near a lower end of the pillar is joined to a rocker assembly including a side sill and rocker reinforcement. A method of making a pillar to rocker joint assembly that comprises a vehicle structural support is formed by welding a structural support pillar to an outer body panel through an access opening in the pillar and welding a rocker reinforcement to a side sill. The rocker reinforcement is welded to the pillar through an access opening in the side sill, an access hole in the body outer panel, and an access opening in the pillar that is vertically spaced relative to the first access opening. A bottom flange of the B-pillar is welded to a lower edge flange of the rocker reinforcement and a lower edge flange of the side sill.

18 Claims, 4 Drawing Sheets

U.S. PATENT DOCUMENTS

| | | | |
|---|---|---|---|
| 5,332,281 | A | 7/1994 | Janotik et al. |
| 5,352,011 | A * | 10/1994 | Kihara et al. .......... 296/203.03 |
| 5,354,115 | A * | 10/1994 | Esaki .................... 296/203.03 |
| 5,388,885 | A * | 2/1995 | Warren ................. 296/203.03 |
| 6,123,378 | A | 9/2000 | Teply et al. |
| 6,283,541 | B1 | 9/2001 | Kim |
| 6,293,618 | B1 | 9/2001 | Sukegawa et al. |
| 6,354,656 | B1 * | 3/2002 | Hwang ....................... 296/209 |
| 6,643,908 | B1 | 11/2003 | Lyons |
| 6,688,000 | B2 | 2/2004 | Wang et al. |
| 6,824,204 | B2 | 11/2004 | Gabbianelli et al. |
| 7,001,097 | B2 | 2/2006 | Wang et al. |
| 7,264,302 | B2 * | 9/2007 | Nagashima ............ 296/187.12 |
| 7,357,448 | B2 * | 4/2008 | Chen et al. ............. 296/203.03 |
| 7,547,063 | B2 * | 6/2009 | Stojkovic et al. ....... 296/203.03 |
| 2003/0088983 | A1 | 5/2003 | Wang et al. |
| 2004/0239091 | A1 | 12/2004 | Horton et al. |
| 2006/0001294 | A1 * | 1/2006 | Balgaard et al. ............ 296/209 |
| 2006/0208537 | A1 | 9/2006 | Dingman et al. |
| 2006/0273630 | A1 | 12/2006 | Chen et al. |
| 2008/0084093 | A1 * | 4/2008 | Kishima et al. ........ 296/203.03 |

FOREIGN PATENT DOCUMENTS

| | | | |
|---|---|---|---|
| CN | 1836956 A | | 9/2006 |
| DE | 10 2006 002 419 A1 | | 8/2006 |
| JP | 04129886 A | * | 4/1992 |
| JP | 05170140 A | * | 7/1993 |
| JP | 2002104239 A | | 4/2002 |
| WO | 0244592 A2 | | 6/2002 |

OTHER PUBLICATIONS

Search Report for EP 07844005, dated Sep. 24, 2009.
Office Action in corresponding Chinese Appn. No. 200780037278.4, May 19, 2010, pp. 1-3.

* cited by examiner

TUBULAR B-PILLAR TO STAMPED ROCKER JOINT AND METHOD OF ASSEMBLING THE SAME

BACKGROUND OF THE INVENTION

1. Field of the Invention

The present invention relates to a B-pillar to a rocker panel joint for vehicles and a method of assembling a tubular B-pillar to a rocker panel assembly.

2. Background Art

Vehicle bodies generally include a B-pillar that is defined as the pillar located behind a front seat door that extends between a rocker panel of the vehicle and a roof. Conventional B-pillars are manufactured by assembling stamped panels that are welded together with spot welds formed by resistance welding equipment.

It has been proposed to form body framing components by hydro-forming tubular members to provide stronger and more durable body framing members. Hydro-formed components provide stronger structural support members that are lighter weight. However, joining a tubular B-pillar with a stamped body component presents challenges compared to joining sheet metal components together because the closed section of the tubular members makes it difficult to weld using resistance welding equipment.

The B-pillar must be joined to both the roof joint and the rocker joint. The B-pillar to rocker joint is critical for crash safety and noise, vibration and harshness (NVH) performance. If the B-pillar to rocker joint is not sufficiently robust, the load carrying capacity of the B-pillar for crash safety will not be fully utilized. Any weakness in the B-pillar to rocker joint may also downgrade the vehicle's torsion and bending stiffness.

Hydro-formed B-pillars having a tubular cross-section do not normally have flanges that may be spot welded to a stamped rocker panel assembly and the outer panel of the body. In addition, the contact area between a hydro-formed tubular member and a stamped rocker assembly is normally smaller because in the hydro-forming process a constant periphery of the tube must be maintained.

These and other challenges are addressed by Applicants' invention as summarized below:

SUMMARY OF THE INVENTION

According to one aspect of the present invention, a pillar to rocker joint assembly is provided for a vehicle. The assembly comprises a tubular pillar having a pinched flange proximate a lower end of the pillar. A first access opening is provided on an inner side of the pillar and a second access opening is provided on an outer side of the pillar. A rocker outer panel is attached to the pillar through one of the first and second access openings and a rocker reinforcement is assembled to the pillar through the other of the first and second access openings. The side sill and rocker reinforcement are attached to each other and are both connected to the pillar. An outer panel is secured to the pillar which are in turn attached to the assembled rocker reinforcement and side sill.

According to other aspects of the invention as they relate to the pillar to rocker joint assembly, the cross-section of the pillar is box-shaped in the middle portion of the pillar. The cross-section of the pillar is an elongated rectangular cross-section at a lower portion of the pillar that fits between the rocker reinforcement and outer panel. The pillar is welded to itself at the pinched flange. The outer surface of the pillar is attached to the outer panel. An inner surface of the pillar is attached to the rocker reinforcement through an access hole in the side sill, an access hole in the outer surface of the pillar and an access opening in the outer panel. A bottom flange is formed by the outer panel, rocker reinforcement and side sill. Welds in portions of the bottom flange may be formed through one thickness of metal of the pillar, one thickness of metal of the rocker reinforcement and one thickness of metal of the side sill.

According to another aspect of the present invention, a method of making a pillar to rocker joint assembly is provided. The rocker joint assembly has a pillar, a rocker reinforcement, a side sill, and an outer body panel. The method comprises welding the pillar to the outer body panel through a first access opening in the inner wall of the pillar. The rocker reinforcement is welded to the side sill. The rocker reinforcement is welded to the pillar through an access opening in the side sill, a second access opening in the pillar that is vertically spaced from the first access opening in the pillar and an access area in the body outer panel. A bottom flange of the pillar, a bottom flange of the rocker reinforcement, and a bottom flange of the side sill are welded together.

According to other aspects of the method of making a pillar to rocker joint assembly, the bottom flange of the pillar is a pinched double flange that is provided adjacent the lower end of the pillar and the method further comprises welding the pinched double flange together prior to welding the pillar to the body outer panel. A single wall thickness may be removed from the pinched double flange to provide a single wall thickness of the pillar that is welded to the bottom side sill flange and the bottom rocker reinforcement flange. The weld of the pinched double flange, the bottom side sill flange and the bottom rocker reinforcement flange is formed below the location where the pinched double flange is welded together. The step of welding the rocker reinforcement to the side sill results in the formation of a tubular assembly. The pillar may be welded to an outer side of the rocker reinforcement. The side sill is welded to an inner side of the rocker reinforcement, thereby forming a joint in which the rocker reinforcement is sandwiched between the pillar and the side sill. The welding steps may be performed by a resistance welding operation. The pillar may have an elongated box cross-section in the longitudinal vehicle direction that is provided above a pinched double flange formed adjacent a lower end of the pillar. The pillar may have a substantially equilateral cross-section above the elongated box-shaped cross-section.

According to another aspect of the present invention, a method of making a vehicle structural support is provided. The method comprises hydro-forming a pillar having a box-shaped cross-section that is located above an elongated box section, and a pinched double flange adjacent a lower end of the pillar. A body panel is stamped and welded to the pillar. A rocker reinforcement and side sill are stamped and then welded together with the side sill being welded to an inner side of the rocker reinforcement. The pillar is welded to an outer side of the rocker reinforcement.

According to other aspects of the method of making a vehicle structural support, a single wall thickness may be removed from the area of the pinched double flange to provide a single wall thickness of the pillar that is welded to a side sill flange and a rocker reinforcement flange. The pillar may be welded to an outer side of the rocker reinforcement within the side sill being welded to an inner side of the rocker reinforcement thereby forming a joint in which the rocker reinforcement is sandwiched between the pillar and the side sill. The method may also further comprise removing a single wall thickness of the pillar in multiple vertically spaced locations to form an upper access hole and a lower access hole in the pillar. An inner surface of the pillar is welded to the rocker reinforcement through the upper access hole and a side sill access hole in the side sill and an access hole in the body outer panel. An outer surface of the pillar is welded to the body outer panel through the lower access hole in the inner surface of the pillar before the rocker reinforcement and side sill are assembled to the pillar.

DETAILED DESCRIPTION OF THE ILLUSTRATED EMBODIMENT

Figure 1:
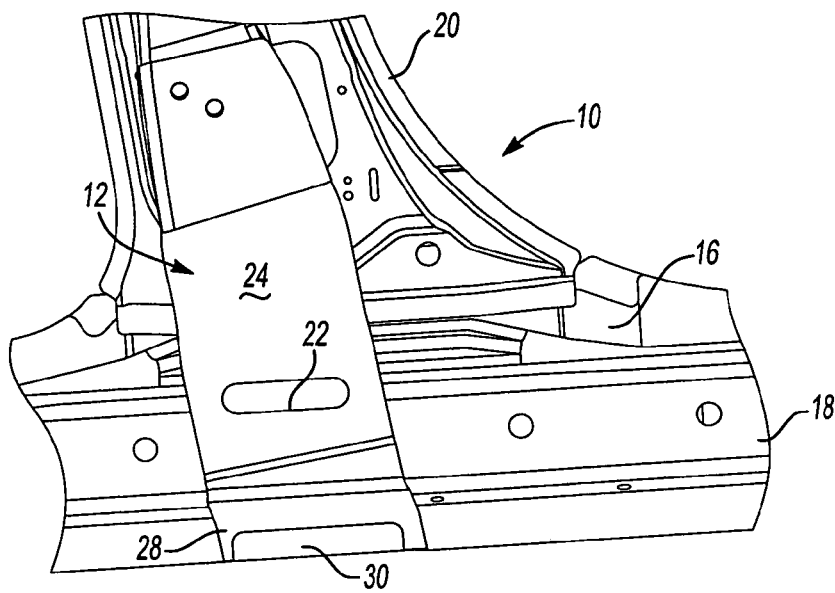
FIG. 1 is a fragmentary side elevation view of a hydro-formed tubular B-pillar to a stamped rocker joint made according to one embodiment of the present invention.

Referring to FIG. 1, a tubular B-pillar to stamped rocker joint assembly 10 is shown. The joint assembly 10 is used to join the B-pillar 12 to a side sill 16 and a rocker reinforcement 18. The side sill 16 and rocker reinforcement 18 together comprise the rocker panel assembly. The B-pillar 12 is welded to an outer body panel 20. While the invention is described with reference to a B-pillar 12, the invention is not limited to a B-pillar and it should be understood that the same general joint assembly and method of making a joint assembly for the present invention could also be applied to other structural pillars of the vehicle.

An upper access hole 22 is also shown in FIG. 1 that is formed in an outer wall 24 of the B-pillar 12. The upper access hole 22 is provided to permit welding the B-pillar 12 to the rocker reinforcement 18 as will be more fully described with reference to FIG. 8 below.

Figure 2:
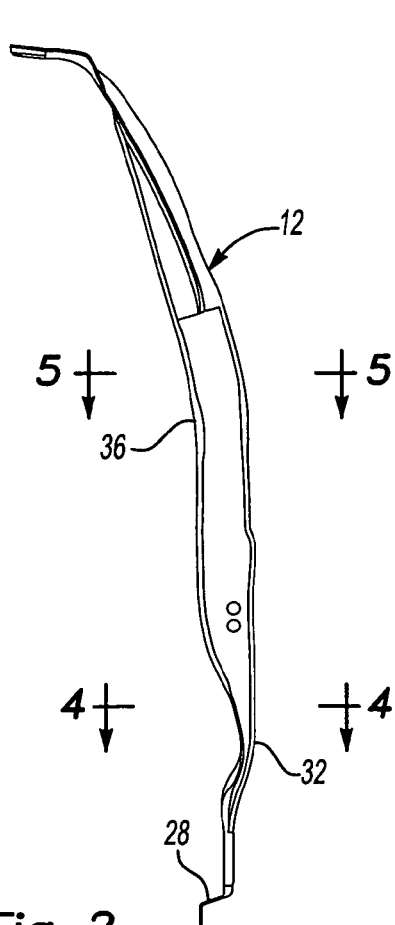
FIG. 2 is a front elevation view of the hydro-formed B-pillar.
Figure 3:
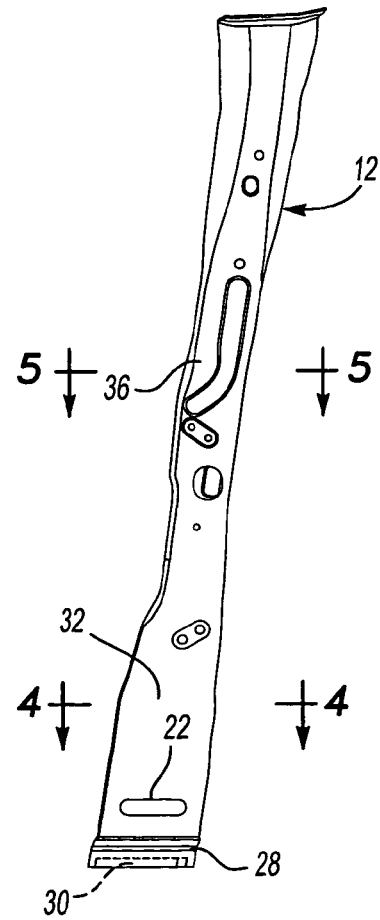
FIG. 3 is an inside elevation view of the hydro-formed B-pillar.

Referring to FIGS. 2 and 3, two views of a B-pillar 12 are shown. The B-pillar extends between the roof (not shown) of a vehicle and a rocker panel assembly 16 and 18 that is partially shown in FIG. 1 above. The B-pillar 12 has a pinched double flange 28 on its lower end that may also be referred to as the bottom flange of the pillar. Referring specifically to FIG. 3, a single wall area 30 is provided on the pinched double flange 28. The single wall area 30 of the B-pillar 12 is provided to facilitate welding the pinched double flange 28 to the side sill 16 and rocker reinforcement 18.

Figure 4:
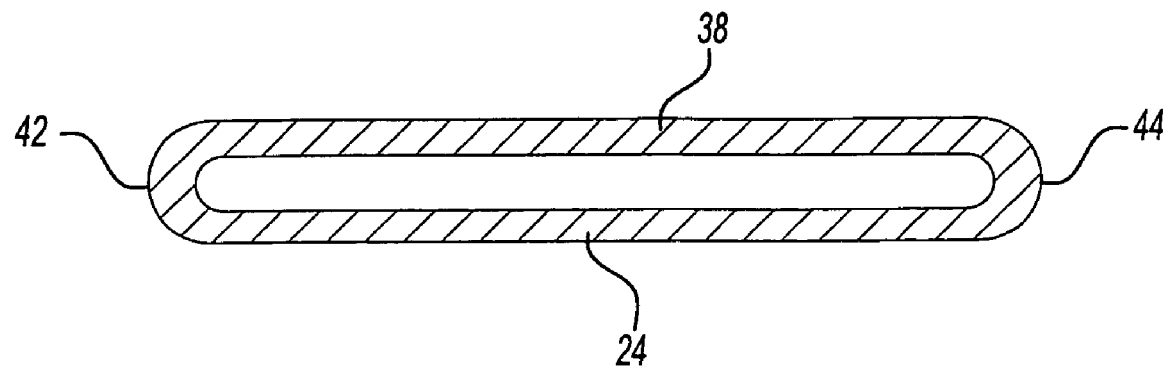
FIG. 4 is a cross-sectional view taken along the line 4-4 in FIGS. 2 and 3.

Referring to FIGS. 2-4, a lower portion 32 of the B-pillar 12 is shown to be formed as an elongated box cross-section in the longitudinal vehicle direction. The lower portion 32 is provided above the pinched double flange that is located at the lower end of the B-pillar. The lower portion 32 of the B-pillar 12 has an outer wall 24 and an inner wall 38 that are joined by a front wall 42 and a back wall 44.

Figure 5:
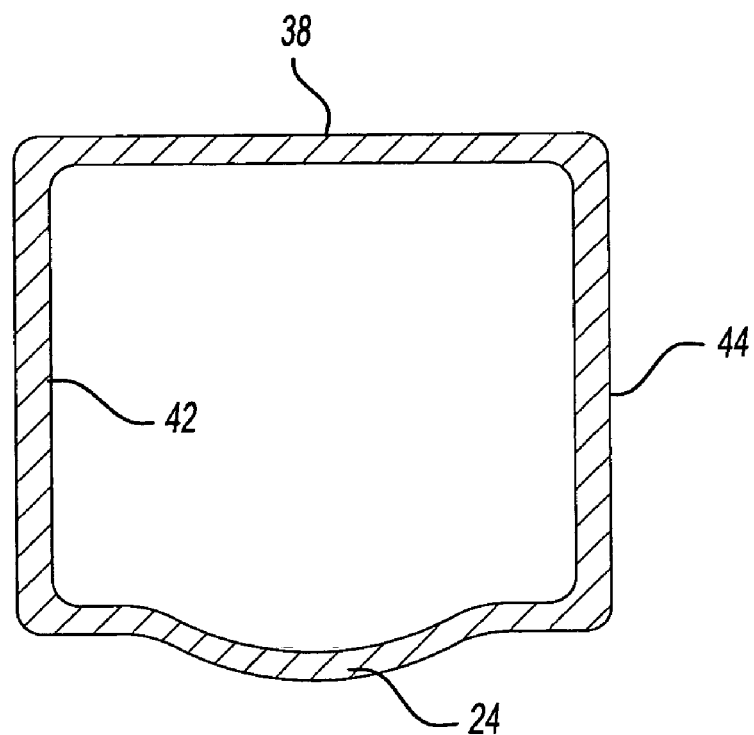
FIG. 5 is a cross-sectional view taken along the line 5-5 in FIGS. 2 and 3.

Referring to FIGS. 2, 3 and 5, a middle portion 36 of the B-pillar 12 is shown to have a substantially equilateral cross-section that is provided above the lower portion 32. As used herein the term "substantially equilateral cross-section" should be construed to mean a generally boxed shaped cross-section having nearly equal sides that are disposed at nearly right angles to each other. The corners of the elongated box cross-section are rounded and the walls may have non-linear areas depending upon the requirements of the vehicle design.

Figure 6:
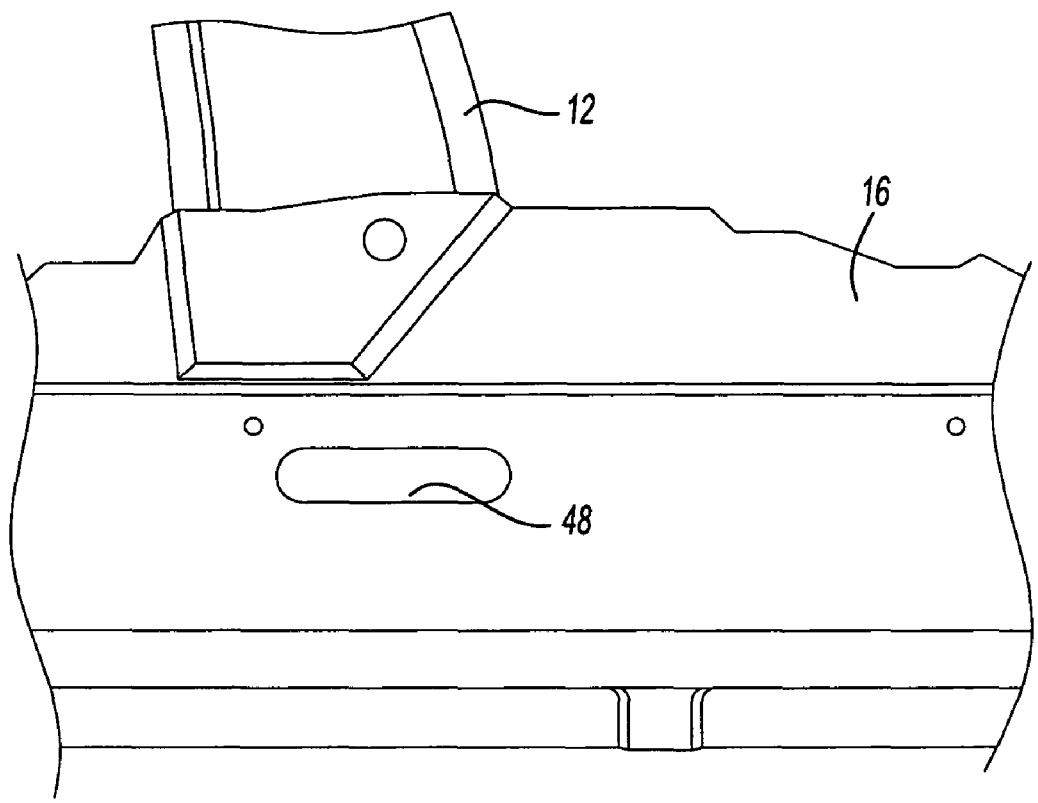
FIG. 6 is a fragmentary side elevation view of a side sill portion of the rocker assembly.

Referring to FIG. 6, the side sill 16 is shown secured to the B-pillar 12. The side sill 16 includes an access hole 48 that provides access to allow welding the rocker reinforcement 18 to the B-pillar 12.

Figure 7:
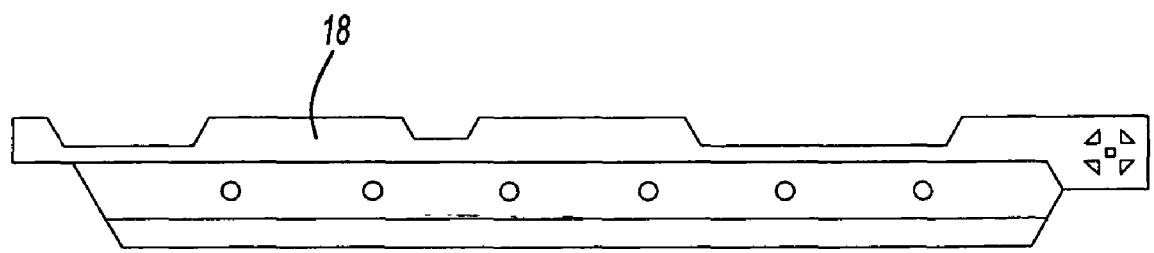
FIG. 7 is a side elevation view of a rocker reinforcement portion of the rocker assembly.

Referring to FIG. 7, a rocker reinforcement 18 is shown. The rocker reinforcement 18 is joined to the side sill 16 and B-pillar 12 as will be more specifically described with reference to FIG. 8 below.

Figure 8:
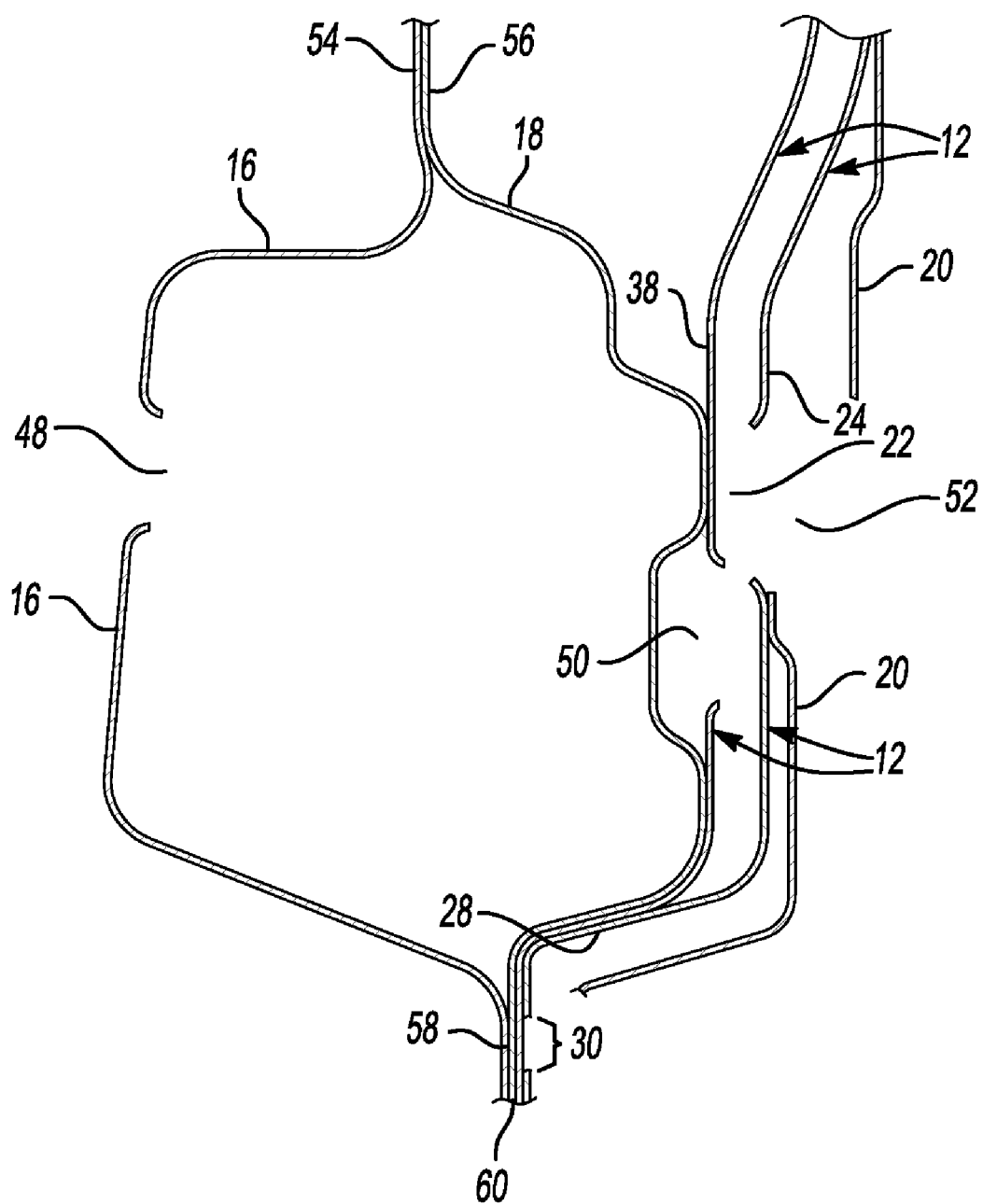
FIG. 8 is a fragmentary transverse cross-sectional view of the B-pillar to the stamped rocker joint made according to one embodiment of the present invention.

Referring to FIG. 8, the joint assembly 10 is illustrated in cross-section to show how the B-pillar 12 and body outer panel are joined as a first subassembly. The side sill 16 and rocker reinforcement 18 are also joined together as a second subassembly. The two subassemblies are joined by welding the rocker reinforcement 18 to the inner wall 38 of the B-pillar 12. A weld is formed that is accessible through an upper access hole 22 in the outer wall 24 of the B-pillar 12, an access hole 48 formed in the side sill 16, and an access hole 52 formed in the outer panel 20. The outer wall 24 of the B-pillar 12 includes a single wall area 30 at the lower end of the B-pillar where it is joined to a bottom flange 58 of the side sill 16 and a bottom flange 60 of the rocker reinforcement 18.

A lower access hole 50 is provided in the inner wall 38 of the B-pillar 12 to permit welding the outer wall 24 to the body outer panel 20 to form the subassembly of the B-pillar 12 and the outer body panel 20 before the B-pillar 12 is joined to the rocker reinforcement 18 as described above.

The side sill 16 and rocker reinforcement 18 are joined at their upper edges by welding an upper edge flange 54 of the side sill 16 to an upper edge flange 56 of the rocker reinforcement 18. Similarly, a lower edge flange 58 of the side sill 16 is welded to a lower edge flange 60 of the rocker reinforcement 18. The single wall area 30 of the B-pillar 12 is also welded to the bottom or lower edge flanges 58 and 60 when the subassemblies are joined together.

While the best mode for carrying out the invention has been described in detail, those familiar with the art to which this invention relates will recognize various alternative designs and embodiments for practicing the invention as defined by the following claims.

What is claimed:

1. A pillar to rocker joint assembly comprising:
   a tubular B-pillar having a pinched flange proximate a lower end of the pillar, the pillar having a first lower access opening on an inner side of the pillar and a second upper access opening on an outer side of the pillar and a single walled area along the pinched flange;
   an outer panel attached to the outer side of the pillar through the first lower access opening;
   a side sill and a rocker reinforcement that are attached to each other, wherein the rocker reinforcement is assembled to the pillar through the second upper access openings;
   wherein
   a plurality of welds are formed through the single walled area at the pinched flange, thereby welding the rocker reinforcement, and the side sill to the inner side of the pillar.

2. The pillar to rocker joint assembly of claim 1 wherein the cross section of the pillar is box shaped in a middle portion of the pillar and wherein the cross section of the pillar is an elongated rectangular cross section in a lower portion of the pillar that fits between the rocker reinforcement and the outer panel.

3. The pillar to rocker joint assembly of claim 1 wherein the inner side of the pillar and the outer side of the pillar are welded to together at the pinched flange.

4. The pillar to rocker joint assembly of claim 1 wherein the outer side of the pillar is welded to the outer panel.

5. The pillar to rocker joint assembly of claim 1 wherein the inner side of the pillar is attached to the rocker reinforcement.

6. The pillar to rocker joint assembly of claim 1 wherein the inner side and the outer side of the tubular pillar are integrally hydro-formed to form a hollow tubular structure in an upper portion, and the pinched flange proximate the lower end.

7. The pillar to rocker joint assembly of claim 1 wherein the outer body panel has a third access opening which is aligned with second upper access opening, such that the inner side of the pillar is accessible and attached to the rocker assembly through the third access opening in the outer body panel.

8. The pillar to rocker joint assembly of claim 1 wherein the side sill has a fourth access opening.

9. The pillar to rocker joint assembly of claim 8 wherein the pillar is attached to the rocker reinforcement through a weld, is the inner side of the pillar is accessible through the second upper access opening in the outer side of the pillar and a third access hole formed in the outer panel which is aligned with one of the first or second access openings in the pillar, and the rocker reinforcement is accessible through a fourth access hole formed in the side sill.

10. The pillar to rocker joint assembly of claim 1 whereby the pillar is disposed outboard of the rocker reinforcement and side sill.

11. A pillar to rocker joint assembly for a vehicle, the assembly comprising:
a tubular B-pillar extending in a vertical direction of the vehicle, the tubular pillar defined by an inner wall and an outer wall integrally formed to form a tubular structure, wherein proximate a lower end of the tubular pillar, the inner and outer walls are pinched together to form a pinched flange, the tubular pillar including a first access opening defined on the inner wall of the pillar, a second access opening defined on the outer wall of the pillar, and a third access opening defined by a single walled area on the pinched flange;
a first subassembly formed of an outer body panel and the pillar, wherein the outer body panel is attached to the pillar through the first opening; and
a reinforcement assembly extending in a longitudinal direction of the vehicle, the reinforcement assembly including a side sill and a rocker reinforcement that are attached to each other,
wherein the reinforcement assembly is attached to the first subassembly along the inner wall of the pillar through the second opening and the third opening such that the first subassembly is disposed outboard of the reinforcement assembly.

12. The pillar to rocker joint assembly of claim 11 wherein the cross section of the pillar is box shaped in a middle portion of the pillar and wherein the cross section of the pillar is an elongated rectangular cross section in a lower portion of the pillar that fits between the rocker reinforcement and the outer panel.

13. The pillar to rocker joint assembly of claim 11 wherein the inner wall of the pillar is welded to the outer wall of the pillar along the pinched flange.

14. The pillar to rocker joint assembly of claim 11 wherein the outer wall of pillar is welded to the outer panel.

15. The pillar to rocker joint assembly of claim 11 wherein the first subassembly is welded to the reinforcement assembly by welding the inner wall of the pillar to the rocker reinforcement, where the rocker reinforcement is accessible through a fourth access hole defined in the side sill, and the inner wall of the pillar is accessible through the second access opening in the outer wall of the pillar and a fifth access opening defined in the outer panel wherein the second and fifth access openings are aligned.

16. A pillar to rocker joint assembly for a vehicle, the assembly comprising:
a tubular B-pillar extending in the vertical direction, the pillar defined by an inner wall and an outer wall integrally formed to form a hollow tubular structure on an upper portion, and a pinched flange proximate a lower end of the pillar such that the inner wall and outer wall are welded together along the pinched flange, the tubular pillar having a first access opening defined on the inner wall of the tubular upper portion of the pillar, a second access opening defined on the outer wall of the tubular upper portion of the pillar, and a third access opening defined by a single walled area on the outer wall along the pinched flange of the pillar;
a tubular reinforcement assembly extending in the longitudinal direction of the vehicle, the reinforcement assembly having a side sill and a rocker reinforcement welded to each other along both an upper edge flange and a lower edge flange; and
a first sub-assembly having an outer body panel welded to the pillar through one of the first and second access openings in the pillar,
wherein the reinforcement assembly is assembled to the first sub-assembly such that the rocker reinforcement is welded to the pillar at a first attachment point along the tubular upper portion of the pillar, and the reinforcement assembly is further attached to the pillar at a second attachment point such that the lower edge flange is welded to the pillar through the third access opening.

17. The pillar to rocker joint assembly of claim 16 wherein the outer body panel includes a fourth access opening which is aligned with one of the first or second access openings, such that the inner wall of the pillar is accessible and through the fourth access opening in the outer body panel and one of the first and second access openings, the tubular reinforcement assembly is welded to the pillar.

18. The pillar to rocker joint assembly of claim 16 whereby the pillar is disposed outboard of the rocker reinforcement and side sill.

* * * * *